(12) United States Patent
Park

(10) Patent No.: US 9,161,104 B2
(45) Date of Patent: Oct. 13, 2015

(54) SYSTEM AND METHOD FOR TRANSMITTING AND RECEIVING A DATA WHEN CHARGING AN ELECTRIC VEHICLE

(75) Inventor: Yun Joong Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 327 days.

(21) Appl. No.: 13/567,332

(22) Filed: Aug. 6, 2012

(65) Prior Publication Data

US 2013/0166136 A1   Jun. 27, 2013

(30) Foreign Application Priority Data

Dec. 23, 2011   (KR) .................. 10-2011-0141708

(51) Int. Cl.
*G07C 5/00* (2006.01)
*B60L 11/00* (2006.01)
(Continued)

(52) U.S. Cl.
CPC .............. *H04Q 9/00* (2013.01); *B60L 11/1838* (2013.01); *H01M 10/425* (2013.01); *H01M 10/46* (2013.01); *H04B 3/548* (2013.01); *H01M 10/44* (2013.01); *H01M 10/48* (2013.01); *H01M 2010/4278* (2013.01); *H01M 2220/20* (2013.01); *H02J 7/0047* (2013.01); *H04B 2203/547* (2013.01); *H04B 2203/5412* (2013.01); *H04Q 2209/30* (2013.01); *H04Q 2209/84* (2013.01); *Y02T 10/7005* (2013.01); *Y02T 90/121* (2013.01); *Y02T 90/128* (2013.01); *Y02T 90/14* (2013.01); *Y02T 90/16* (2013.01); *Y02T 90/163* (2013.01)

(58) Field of Classification Search
CPC ..... G07C 5/008; B60L 11/00; B60L 11/1838; B60L 11/1861; B60L 11/1862
USPC ........................................................ 320/109
See application file for complete search history.

(56) References Cited

U.S. PATENT DOCUMENTS

| 2009/0184833 | A1 | 7/2009 | Tonegawa et al. | |
| 2009/0278492 | A1 | 11/2009 | Shimizu et al. | |
| 2012/0098488 | A1* | 4/2012 | Ichikawa | 320/109 |
| 2012/0112694 | A1* | 5/2012 | Frisch et al. | 320/109 |

FOREIGN PATENT DOCUMENTS

| JP | 2007-230520 A | 9/2007 |
| JP | 2009-033264 A | 2/2009 |

(Continued)

*Primary Examiner* — Y. Beaulieu
*Assistant Examiner* — Basil T Jos
(74) *Attorney, Agent, or Firm* — Mintz Levin Cohn Ferris Glovsky and Popeo, P.C.; Peter F. Corless

(57) ABSTRACT

A system and method for transmitting and receiving a data while charging a vehicle includes first module configured to calculate an expected charging time based on an instantaneous SOC value obtained through a CAN communication when charging the electrical vehicle is started and a second module that is configured to determine a size of transmittable or receivable data considering a transmission speed and based on information obtained through the expected charging time analysis module. Communication equipment enables data to be transmitted and received between the vehicle and a data center via power line communication. A first storage unit within the vehicle and a second data storage unit provided within the data center are configured to store telematics related data, and an output unit is configured to output information related to data determined by the second module.

12 Claims, 4 Drawing Sheets

(51) Int. Cl.
*B60L 11/18* (2006.01)
*H04Q 9/00* (2006.01)
*H01M 10/42* (2006.01)
*H01M 10/46* (2006.01)
*H04B 3/54* (2006.01)
*H01M 10/44* (2006.01)
*H01M 10/48* (2006.01)
*H02J 7/00* (2006.01)

(56) References Cited

FOREIGN PATENT DOCUMENTS

| | | |
|---|---|---|
| JP | 2010114988 A | 5/2010 |
| JP | 2011-182239 A | 9/2011 |
| KR | 1020110029969 A | 3/2011 |
| KR | 10-2011-0084634 | 7/2011 |
| WO | 2009/014257 A1 | 1/2009 |

* cited by examiner

SYSTEM AND METHOD FOR TRANSMITTING AND RECEIVING A DATA WHEN CHARGING AN ELECTRIC VEHICLE

CROSS-REFERENCES TO RELATED APPLICATIONS

Priority to Korean patent application number 10-2011-0141708, filed on Dec. 23, 2011, which is incorporated by reference in its entirety, is claimed.

BACKGROUND OF THE INVENTION

1. Field of the Invention

The present invention relates to a system and a method for transmitting and receiving data when charging an electrical vehicle, and more particularly, to a system and a method for transmitting and receiving data when charging an electrical vehicle in which not only charging the electrical vehicle but also transmitting various information needed for the vehicle or receiving information stored in the vehicle to be used through a power line communication are enabled.

2. Description of the Related Art

Recently, a power line communication (PLC) technology has emerged as a leading home network technology because power line communication is able to send data via a power line. Particularly, the power line communication is advantageous in that a separate communication network is not required because a communication network can be set up in any location such as rural or urban areas as long as electricity is available, thereby achieving a significant cost-saving effect. Even in some of the most technologically advanced countries around the world, data transmission options are still not readily available. In Korea, for example, which is a leading country in communication network infrastructure such as an optical cable, network access is still not provided in some of the more rural areas. Thus, PLC allows for data transmission to these areas by using a power line even when the optical cables, e.g., are not available.

Since PLC only requires power lines so that a home network in which home appliances can be controlled through internet remotely by several operators that commercially utilize the PLC technology. Thus, if an electronic product is equipped with a server and a modem, the product can be connected to a network.

As shown in FIG. 1, PLC technology using uses a low voltage power line such as 100 to 220V power lines, a PLC router attached to a utility pole assigns a home address that is a unique address and a PLC coupler located outside home that separates a communication signal carried on the power line. The communication signal recovers a signal from an initial transmission stage through, e.g., a personal computer (PC) within home or a PLC modem provided within an electronic product. The power line communication described above has a simple communication principle. The frequency used for power transmission in Korea, for example, is an alternating current frequency of 60 Hz, which is converted to a direct current frequency by the electronic product through a power converter. Here, a power line having the alternating current frequency of 60 Hz becomes a communication channel. A communication signal is converted to a high frequency signal and sent through the power line, wherein the signal is separated and received by a receiver terminal by using a high frequency filter.

SUMMARY OF THE INVENTION

Accordingly, the present invention provides a system and a method for transmitting and receiving a data while charging an electrical vehicle to transmit various information needed for the vehicle or receive information stored in the vehicle to be used through a power line communication.

In accordance with an aspect of the present invention, a system for transmitting and receiving a data when charging a vehicle (e.g., an electric vehicle) includes an expected charging time analysis (first) module configured to calculate an expected charging time based on an instantaneous state of charge (SOC) value obtained through a controller area network (CAN) communication when charging the electrical vehicle is initiated. A transmittable or receivable data determination (second) module is configured to determine a size of a transmittable or receivable data considering a transmission speed and based on information obtained through the first module. Communication equipment is configured to enable data transmission and receive data between the vehicle and a data center. A first data storage unit provided within the vehicle, is configured to store telematics related data, and a second data storage unit provided at the data center is configured to store the telematics related data. An output unit is configured to output information related to data determined by the second module.

More specifically, the second module determines or defines a list of services transmitted from the data center in consideration of the transmission speed and on charging time information analyzed by the first module.

The first module includes: an SOC data storage unit configured to analyze and store a received SOC data periodically transmitted from an ECU of the electrical vehicle through a CAN-high communication; a comparison operation unit configured to calculate a difference between a full charge amount and a current SOC amount; and an expected charging time calculating unit configured to calculate the expected charging time according to a charging method. When a list of a transmittable data is output to the output unit and a service item in the list is triggered by user manipulation, the transmittable or receivable data determination module transmits information about the selected service item to the data center through a communication apparatus. The charging method may be defined as a higher speed charging or a lower speed charging. The output unit recognizes the service item that is triggered by the user manipulation according to a touch method or a voice recognition method.

In accordance with another aspect of the present invention, a method of transmitting and receiving a data when charging an electrical vehicle includes: calculating, by a first module, an expected charging time based on an instantaneous SOC value obtained through a CAN communication when an vehicle is plugged in to be charged; recognizing, by the first module, a difference between a full charge amount and a current SOC amount and determining whether a high speed charging method or a low speed charging method is used by a charger to calculate the expected charging time; determining, by a second module, a size of data that is transmittable or receivable within the expected charging time; reading, by the second module, corresponding data and data information among telematics related data of the vehicle in which the second module is stored to transmit the corresponding data and data information to a data center through communication equipment; and outputting, by an output unit, telematics data to a driver prior to transmitting the telematics data to the datacenter to confirm the data to be transmitted to the data center.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

Figure 1:
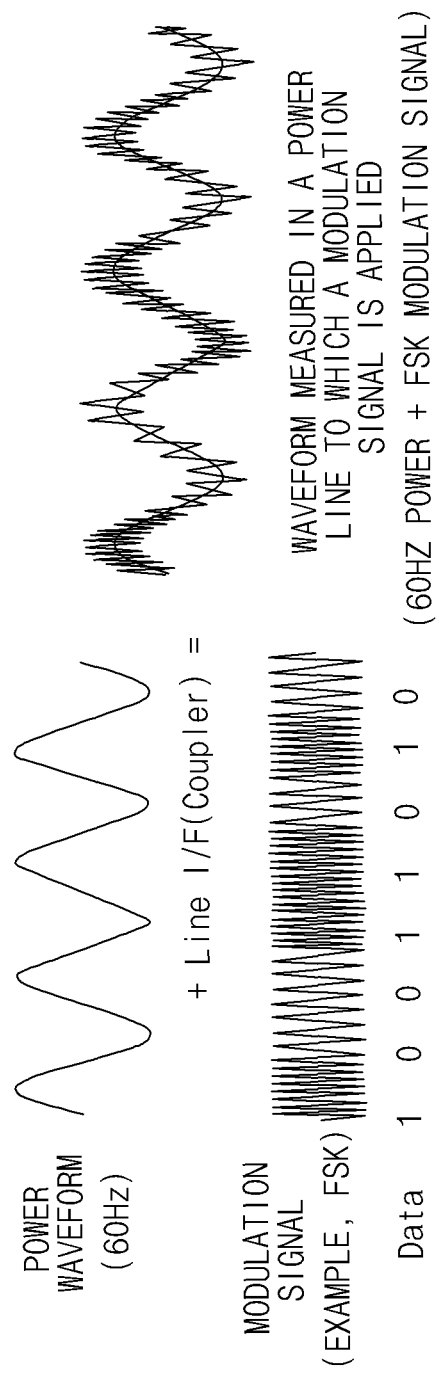
FIG. 1 is a waveform diagram for explaining a general principle of a power line communication.
Figure 2:
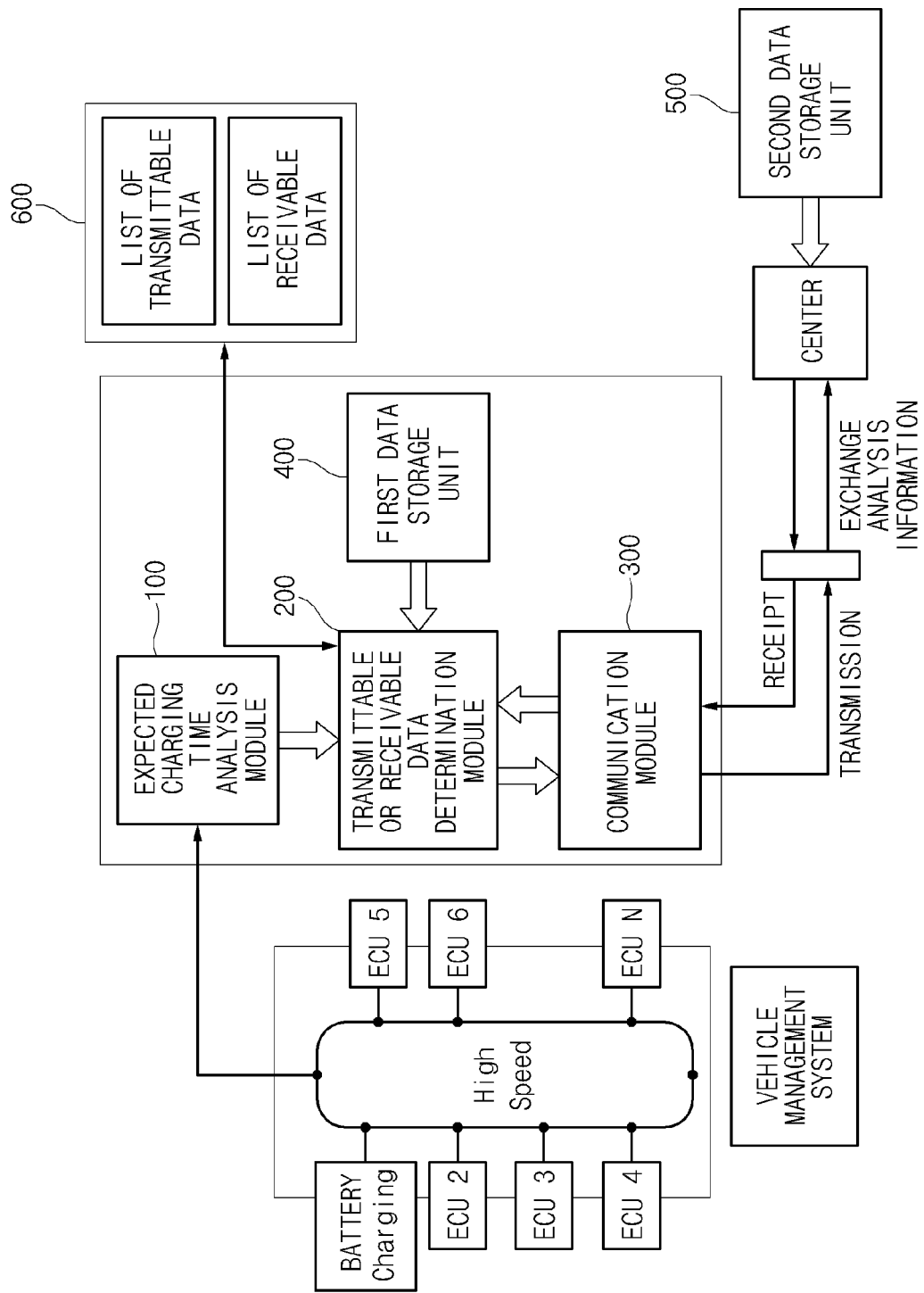
FIG. 2 is a view illustrating a configuration of a data transmission and receiving system when charging an electrical vehicle according to the present invention.

Hereinafter, exemplary embodiments of the present invention will be described herein below with reference to the accompanying drawings. FIG. 2 is a view illustrating a configuration of a data transmission and receiving system when charging an electrical vehicle according to the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum) that have charging capabilities.

Referring to FIG. 2, a data transmission and receiving system when charging an electrical vehicle according to the present invention includes an expected charging time analysis (first) module 100 that calculates an expected charging time based on an instantaneous SOC value obtained through a CAN communication when a user starts charging a vehicle. A transmittable or receivable data determination (second) module 200 determines a size of transmittable data considering a transmission speed and based on information obtained through the expected charging time analysis module 100. Communication equipment 300 enables data transmission and reception between the vehicle and a data center, and a first data storage unit 400, provided in a vehicle, stores telematics related data. A second data storage unit 500, provided at the data center, stores the telematics related data, and an output unit 600 outputs information related to data determined by the transmittable or receivable data determination module 200. The transmittable or receivable data determination module 200 determines a service list transmitted from the center considering the transmission speed and based on the charging time information analyzed by the expected charging time analysis module 100.

Figure 3:
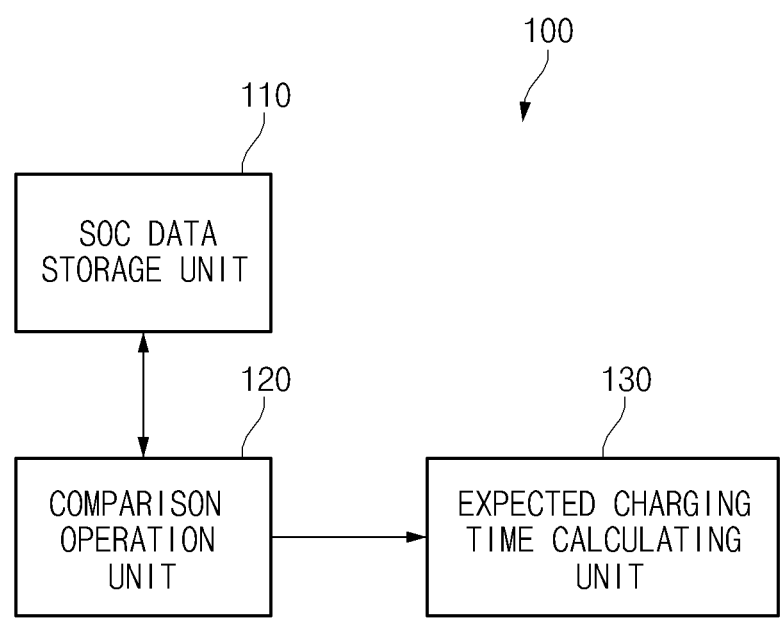
FIG. 3 is a view for explaining a detailed configuration of an expected charging time analyzing module shown in FIG. 2.

As shown in FIG. 3, the expected charging time analysis module 100 includes a SOC data storage unit 110 that analyzes and stores a received SOC data transmitted periodically from, e.g., an engine control unit (ECU) of the vehicle through a CAN-high communication device. Also a comparison operation unit 120 calculates a difference between a full charge amount and a current SOC amount, and an expected charging time calculating unit 130 calculates an expected charging time according to a charging method. These calculation units 120 and 130 may be embodied as a single processing unit or a separate processing units depending upon the overall processing capacity of each individual unit.

When a list of data that is transmittable is output to the output unit 600 and a service in the list is triggered by user manipulation, the transmittable or receivable data determination module 200 transmits selected service list information to the data center through a communication apparatus. In some embodiments of the present invention, the charging method may be either a fast charging or slow charging method.

The output unit 600 recognizes the service list that is triggered by the user manipulation according to, e.g., a touch method or voice recognition method. The output unit 600 may also include a display device that outputs an image and a voice device that is configured to both output voice audio and receive voice audio (e.g., a speaker and a microphone).

A method of operating the data transmission and receiving system when charging the electrical car configured as above will be described. The data transmission and receiving system when charging e.g., an electric vehicle according to the present invention obtains vehicle-side information related to the expected charging time when the vehicle is plugged in to be charged and selects an available service item based on the measured vehicle-side information. The service item, when desired, is provided from a data center to the driver while the vehicle is charging, and thus, the vehicle may communicate with the data center.

Figure 4:
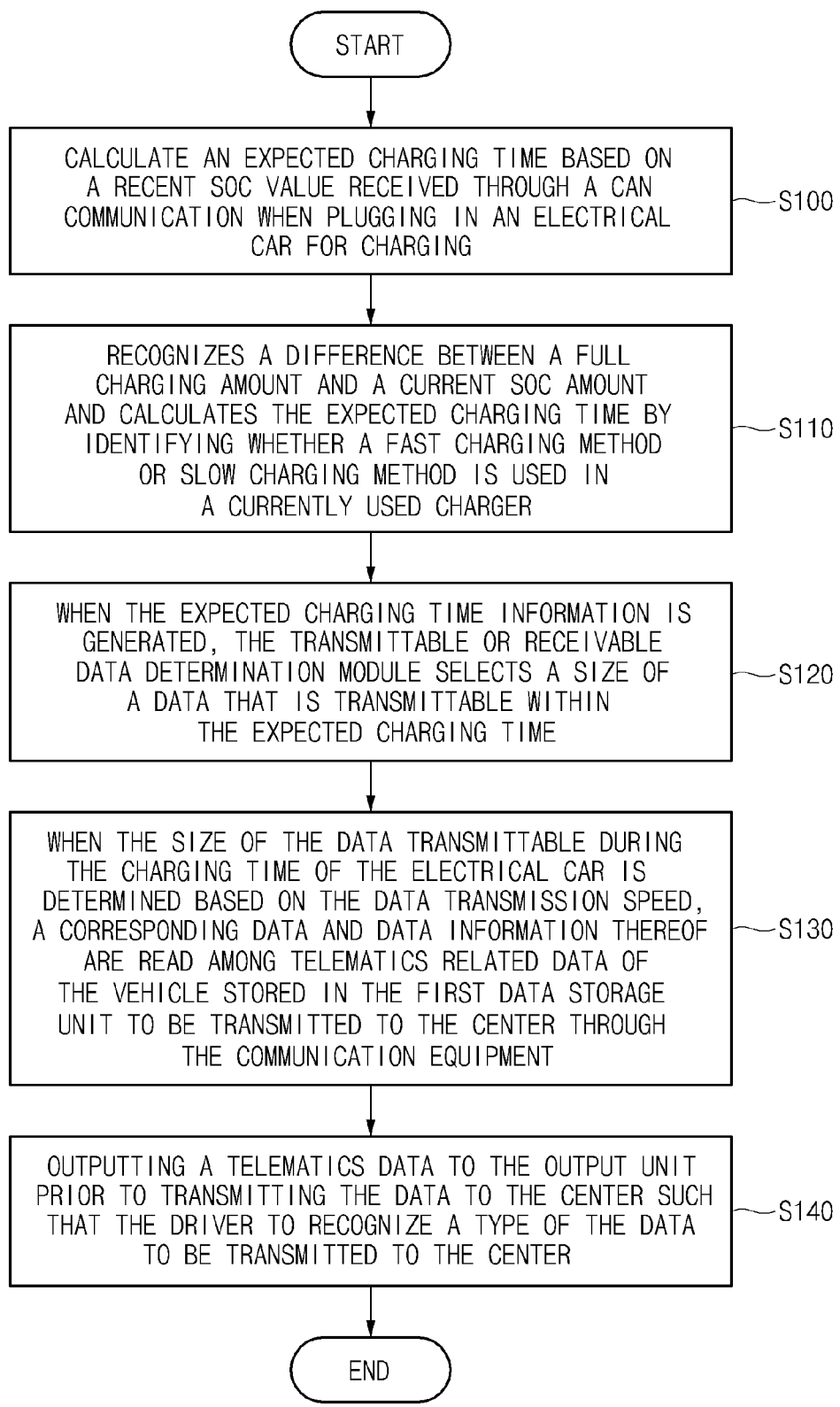
FIG. 4 is an operation flow chart of a data transmission and receiving method when charging an electrical vehicle according to the present invention.

FIG. 4 is an operation flow chart of a data transmission and receiving method when charging an electrical vehicle according to the present invention. Referring to FIG. 4, when the driver enters to a charging station to charge the driver's vehicle and plugs-in the vehicle to be charged, the expected charging time is calculated based on a recent SOC value received through the CAN communication (S100).

Namely, the comparison operation unit 120 of the expected charging time analysis module 100 periodically receives an SOC value of a battery from, e.g., the ECU, of the vehicle to periodically analyze an SOC data and stores the SOC data in the SOC data storage unit 110 while the comparison operation unit 120 calculates the difference between the full charging amount and the current SOC amount. The comparison operation unit 120 recognizes the difference between the full charging amount and the current SOC amount and determines whether a fast charging method or slow charging method is being used by a charger to calculate the expected charging time (S110).

When expected charging time information is generated by the expected charging time analysis module 100, the transmittable or receivable data determination module 200 selects a size of data that is transmittable within the expected charging time (S120). Here, the size of the transmittable data is determined based on the data transmission speed.

When the size of the data transmittable during the charging time of the vehicle is determined based on the data transmission speed, the transmittable or receivable data determination module 200 reads a corresponding data and data information thereof among telematics related data of the vehicle stored in the first data storage unit 400 to be transmitted to the data center through the communication equipment 300 (S130). Here, the data stored in the first data storage unit 400 includes the vehicle condition information including, for example, diagnosis related data and other information, and the data information indicates, for example, a data type, a data size, or a data name.

Here, the transmittable or receivable data determination module 200 enables the driver to confirm the type of a data to be transmitted to the data center by outputting a telematics data to the output unit 600 prior to transmitting the data to the center (S140).

Meanwhile, the transmittable or receivable data determination module 200 determines a data receivable from the data center during a period of time in which the vehicle is being charged and provides a list of the receivable data. It should be noted that the transmission speed along with the charging time is considered, as described above.

The determined data list is outputted through the output unit 600 and the driver identifies the data list provided via video and audio means through the output unit 600 to select a desired data through e.g., a touch method or a voice recognition method. A data request signal for requesting the selected data is then transmitted to the data center through the communication equipment 300. Here, a guidance module or a guidance and service tree module may be separately provided to provide the data list and enable triggering a service item in the list.

Furthermore, the control logic of the present invention may be embodied as non-transitory computer readable media or a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

According to the present invention, when charging the electrical vehicle, the vehicle is not only charged but also transmits various information needed for a vehicle or receives information stored in the vehicle through a PLC communication, thereby achieving an effect of adding various service functions such as security or VRM to a charging vehicle.

In the above, although the embodiments of the present invention have been described with reference to the accompanying drawings, a person skilled in the art should apprehend that the present invention can be embodied in other specific forms without departing from the technical spirit or essential characteristics thereof. Thus, the embodiments described above should be construed as exemplary in every aspect and not limiting.

What is claimed is:

1. A system for transmitting and receiving data when charging a vehicle, the system comprising:
   a first module including an instantaneous state of charge (SOC) data storage unit and a processor configured to calculate an expected charging time based on the SOC value obtained through a controller area network (CAN) communication once charging the vehicle is started;
   a second module including a second processor configured to determine a size of transmittable or receivable data considering a transmission speed, wherein the determination is based on information obtained through the first module;
   communication equipment configured to transmit and receive data between the vehicle and a data center via a power line communication (PLC);
   a first data storage unit provided within the vehicle and configured to store telematics related data;
   a second data storage unit provided at the data center and configured to store the telematics related data; and
   an output unit configured to output information related to data determined by the second module,
   wherein the second module identifies a service list transmitted from the data center considering the transmission speed and based on charging time information analyzed by the first module.

2. The system according to claim 1, wherein the first module comprises:
   the SOC data storage unit configured to analyze and store received SOC data periodically transmitted from an engine control unit (ECU) within the vehicle through a CAN-High communication; and
   the processor including:
   a comparison operation unit configured to calculate a difference between a full charge amount and a current SOC amount; and
   an expected charging time calculating unit configured to calculate the expected charging time according to a charging method.

3. The system according to claim 2, wherein the charging method is a higher speed charging or a lower speed charging.

4. The system according to claim 1, wherein, when a list of a transmittable data is output to the output unit and a service item in the list is triggered by user manipulation, the second module transmits information about the selected service item to the data center through a communication apparatus.

5. The system according to claim 4, wherein the output unit recognizes the service item that is triggered by the user manipulation according to a touch method or a voice recognition method.

6. A method of transmitting and receiving data when charging a vehicle, the method comprising:
   receiving, by a first module including an instantaneous state of charge (SOC) data storage unit and a processor, an SOC value of a battery of the vehicle, the first module including the SOC data storage unit having memory that stores the SOC value received from the vehicle;
   calculating, by the processor of the first module, an expected charging time based on the SOC value obtained through a controller area network (CAN) communication when the vehicle is plugged in to be charged;
   recognizing, by the processor of the first module, a difference between a full charge amount and a current SOC amount and determining whether a high speed charging method or a low speed charging method is used by a charger to calculate the expected charging time;
   determining, by a second module, a size of data that is transmittable or receivable within the expected charging time;
   reading, by the second module including a second processor, corresponding data and data information among telematics related data of the vehicle in which the second module is stored to transmit the corresponding data and data information to a data center through communication equipment;
   outputting, by an output unit, telematics data to a driver prior to transmitting the telematics data to the data center to allow the driver to confirm a type of a data to be transmitted to the data center; and
   identifying, by the second module, a service list transmitted from the data center considering a transmission speed and based on charging time information analyzed by the first module.

7. The method according to claim 6, wherein calculating the expected charging time comprises:
   analyzing and storing, by the SOC data storage unit, received SOC data transmitted periodically from an engine control unit (ECU) of the vehicle through a CAN-High communication;

calculating, by a comparison operation unit, a difference between the full charge amount and the current SOC amount; and calculating, by an expected charging time calculating unit, the expected charging time according to a charging method.

8. The method according to claim 6, wherein, when a list of data that is transmittable to the output unit is outputted and a service in the list is triggered by user manipulation, the second module transmits information about the selected service to the data center through a communication apparatus.

9. The method according to claim 6, wherein the output unit recognizes a service item that is triggered by user manipulation according to a touch method or a voice recognition method.

10. A non-transitory computer readable medium containing program instructions executed by a processor or controller, the computer readable medium comprising:

program instructions that calculate an expected charging time based on an instantaneous state of charge (SOC) value obtained through a controller area network (CAN) communication when a vehicle is plugged in to be charged;

program instructions that recognize a difference between a full charge amount and a current SOC amount and determining whether a high speed charging method or a low speed charging method is used by a charger to calculate the expected charging time;

program instructions that determine a size of data that is transmittable or receivable within the expected charging time;

program instructions that read corresponding data and data information among telematics related data of the vehicle to transmit the corresponding data and data information to a data center through communication equipment;

program instructions that output telematics data to a driver prior to transmitting the telematics data to the data center to allow the driver to confirm a type of a data to be transmitted to the data center; and program instructions that identify a service list transmitted from the data center considering a transmission speed and based on charging time information analyzed by the expected charging time analysis module.

11. The non-transitory computer readable medium according to claim 10, wherein the program instructions that calculate the expected charging time comprises:

program instructions that analyze and store received SOC data transmitted periodically from an ECU of the electrical vehicle through a CAN-High communication;

program instructions that calculate a difference between a full charge amount and a current SOC amount; and program instructions that calculate the expected charging time according to a charging method.

12. The non-transitory computer readable medium according to claim 10, wherein, when a list of data that is transmittable is outputted and a service in the list is triggered by user manipulation, program instructions transmit information about the selected service to the data center through a communication apparatus.

\* \* \* \* \*